US010017252B2

(12) United States Patent
Jobst et al.

(10) Patent No.: US 10,017,252 B2
(45) Date of Patent: Jul. 10, 2018

(54) MODULAR MONUMENT FOR TRANSPORTING AN ITEM IN A VEHICLE

(71) Applicant: Airbus Operations GmbH, Hamburg (DE)

(72) Inventors: Magdalena Jobst, Hamburg (DE); Stephan Sontag, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 196 days.

(21) Appl. No.: 14/925,476

(22) Filed: Oct. 28, 2015

(65) Prior Publication Data
US 2016/0122019 A1 May 5, 2016

(30) Foreign Application Priority Data

Oct. 29, 2014 (DE) .......................... 10 2014 115 747

(51) Int. Cl.
*B64D 11/00* (2006.01)
*A61G 3/00* (2006.01)
*A61G 12/00* (2006.01)

(52) U.S. Cl.
CPC ................ *B64D 11/00* (2013.01); *A61G 3/00* (2013.01); *A61G 12/001* (2013.01);
(Continued)

(58) Field of Classification Search
CPC .............. B64D 2009/006; B64D 11/00; B64D 11/0046; B64D 11/0069; B64D 11/0092;
(Continued)

(56) References Cited

U.S. PATENT DOCUMENTS 4,071,210 A * 1/1978 Mutke ...................... B60N 2/34
  105/314
4,115,884 A * 9/1978 Keogh ..................... A61G 3/00
  296/19

(Continued)

FOREIGN PATENT DOCUMENTS

DE         9110357 U1   11/1991
DE     102008062466 A1    8/2010
(Continued)

OTHER PUBLICATIONS

German Patent Office, German Search Report for German Patent Application No. 10 2014 115 747.8 dated Oct. 21, 2015.

*Primary Examiner* — Richard R Green
*Assistant Examiner* — Michael A. Fabula
(74) *Attorney, Agent, or Firm* — Lorenz & Kopf, LLP

(57) ABSTRACT

A modular monument comprises a first transport module with a tongue and a second transport module with a groove. The transport modules are arranged one on top of the other and aligned flush with each other on a lateral surface of the monument with the monument in an assembled state. The tongue and grooves engage into each other in the assembled state of the monument in such a way that the transport modules can be shifted relative to each other in a longitudinal direction. The first transport module exhibits a locking element to prevent a relative motion of the two transport modules in the longitudinal direction in the assembled state. The embodiment further relates to an aircraft with a modular monument, as well as to a method for transporting an item in a vehicle.

6 Claims, 9 Drawing Sheets

(52) U.S. Cl.
CPC .. *A61G 2220/10* (2013.01); *B64D 2011/0046* (2013.01); *B64D 2011/0092* (2013.01)

(58) Field of Classification Search
CPC ............ B64D 11/0602; B64D 11/0604; B64D 11/0629; B64D 11/0639; B64D 11/06395; B64D 2011/0046; B64D 2011/0069; B64D 2011/0092
See application file for complete search history.

(56) References Cited

U.S. PATENT DOCUMENTS

| | | | | |
|---|---|---|---|---|
| 5,002,172 | A * | 3/1991 | Stringer | B60N 2/0232 192/142 R |
| 5,083,727 | A * | 1/1992 | Pompei | B64D 11/0007 105/345 |
| 5,314,143 | A * | 5/1994 | Luria | B64D 11/0007 104/88.01 |
| 5,413,292 | A * | 5/1995 | Luria | B60L 9/00 105/327 |
| 5,490,703 | A * | 2/1996 | Hewko | A61G 1/0293 244/118.6 |
| 5,779,296 | A * | 7/1998 | Hewko | A61G 1/06 244/118.6 |
| 5,964,065 | A * | 10/1999 | Migurski | E04H 3/08 52/64 |
| 6,302,358 | B1 * | 10/2001 | Emsters | B64C 1/20 244/137.1 |
| 6,318,672 | B1 * | 11/2001 | Traylor | B64D 11/00 244/118.5 |
| 8,240,605 | B2 * | 8/2012 | Cremers | B64D 11/06 244/118.5 |
| 8,888,043 | B1 * | 11/2014 | Olliges | B64D 11/00 105/316 |
| 9,156,553 | B1 * | 10/2015 | Johnson | B64D 9/00 |
| 9,604,724 | B2 * | 3/2017 | Savard | B64D 11/0641 |
| 9,611,975 | B2 * | 4/2017 | Chinn | B60P 7/0815 |
| 2002/0108529 | A1 * | 8/2002 | Trujillo | B64D 11/0007 104/165 |
| 2002/0130219 | A1 * | 9/2002 | Parseghian | B64C 1/18 244/118.6 |
| 2003/0057323 | A1 * | 3/2003 | Keogh | A61G 3/00 244/118.5 |
| 2003/0143052 | A1 * | 7/2003 | Fehrle | A61G 1/06 410/46 |
| 2006/0060704 | A1 * | 3/2006 | Lavie | A61G 3/001 244/118.5 |
| 2007/0102579 | A1 * | 5/2007 | Krieglsteiner | B64D 11/00 244/129.1 |
| 2009/0308672 | A1 * | 12/2009 | Soldatos | A61G 5/045 180/65.1 |
| 2010/0308190 | A1 * | 12/2010 | Tkocz | B64D 11/04 248/222.14 |
| 2011/0310556 | A1 * | 12/2011 | Schmid | B64D 11/0023 361/690 |
| 2012/0248245 | A1 * | 10/2012 | Schliwa | B61D 35/00 244/118.5 |
| 2012/0261981 | A1 * | 10/2012 | Paul | B64D 9/00 307/9.1 |
| 2012/0328364 | A1 * | 12/2012 | Tkocz | B64D 11/04 403/322.4 |
| 2013/0181419 | A1 * | 7/2013 | Benning | B62B 3/005 280/79.2 |
| 2013/0259562 | A1 * | 10/2013 | Burd | B64D 11/04 403/187 |
| 2013/0259593 | A1 * | 10/2013 | Moradians | B64D 9/003 410/77 |
| 2013/0280011 | A1 * | 10/2013 | Burd | B64D 11/0023 411/371.2 |
| 2013/0328361 | A1 * | 12/2013 | Egan | B64D 11/06 297/188.01 |
| 2014/0033956 | A1 * | 2/2014 | Kelly | B62B 3/005 108/50.11 |
| 2014/0064827 | A1 * | 3/2014 | Korenromp | B64D 11/00 403/63 |
| 2014/0151503 | A1 * | 6/2014 | De La Fuente Carnero | A61G 3/0825 244/118.6 |
| 2015/0069891 | A1 * | 3/2015 | Schimanowski | B64D 11/04 312/242 |
| 2015/0115100 | A1 * | 4/2015 | Schliwa | B64D 11/003 244/118.1 |
| 2015/0122963 | A1 * | 5/2015 | Mochizuki | F16C 29/004 248/323 |
| 2015/0225082 | A1 * | 8/2015 | Levron | B64D 9/00 244/137.1 |
| 2016/0194084 | A1 * | 7/2016 | Rajasingham | B64D 11/0696 244/118.5 |
| 2016/0304183 | A1 * | 10/2016 | Ahlen | B64C 1/00 |

FOREIGN PATENT DOCUMENTS

| | | |
|---|---|---|
| EP | 0965319 B1 | 11/2005 |
| JP | 2013125218 A1 | 7/2015 |

\* cited by examiner

MODULAR MONUMENT FOR TRANSPORTING AN ITEM IN A VEHICLE

CROSS-REFERENCE TO RELATED APPLICATION

This application claims the benefit of the filing date of the German Patent Application No. 10 2014 115 747.8 dated Oct. 29, 2014, which is incorporated herein by reference in its entirety.

TECHNICAL FIELD

The present this relates to the flexible transport of items in a vehicle. In particular, this relates to a modular monument for transporting an item in a vehicle. This further relates to an aircraft with a modular monument for transporting an item, as well as to a method for transporting an item in a vehicle.

BACKGROUND

In addition, other objects, desirable features and characteristics will become apparent from the subsequent summary and detailed description, and the appended claims, taken in conjunction with the accompanying drawings and this background.

Nowadays, transported items are transported on airplanes predominantly in the freight area, i.e., in the cargo hold of the airplane. In addition, transported items are also accommodated in the cabin of the airplane, to include in particular medical equipment, which must be kept available when transporting patients or patient transports inside of the cabin, where the patient is also being transported.

For purposes of patient transport in an airplane, a scaffold is normally built inside of the cabin, with which transport units, i.e., storage compartments for medical material, are fastened. Scaffolds like these in conjunction with the transport units can be constructed and arranged similarly to onboard galleys or sanitary facilities inside of the airplane cabin, for example. To prepare a patient transport, which requires that the scaffolds and transport units be set up inside of the cabin, additional time is often needed on the ground, on the one hand to assemble the scaffold before the flight, and on the other to dismantle the scaffold after the flight. Furthermore, such a scaffold requires extra space in the cabin for transporting items or patients. To this end, it may become necessary to remove several passenger seats from the cabin. Moreover, time-consuming cleaning and disinfecting measures must be implemented both before and after the flight, in particular for patient transports.

EP 0 965 319 B1 shows an airplane with a device for transporting recumbent patients in an airplane. The device is set up inside of an airliner cabin as a patient transport unit, and exhibits medical power supply units as well as a stretcher.

U.S. Pat. No. 8,240,605B2 shows an airplane with different seating arrangements for patient transport. Several seats situated one behind the other are here set up in the front and rear area of the aircraft in such a way that a patient resting area can be furnished.

SUMMARY

In a first aspect, there is shown a modular monument for transporting an item, or good also denoted as "transported material" in the following, in a vehicle. The modular monument exhibits a first transport module with a tongue and a second transport module with a groove. With the monument in an assembled state, the two transport modules are arranged one on top of the other, and aligned flush with each other on a lateral surface of the monument. In the assembled state of the monument, the tongue engages into the groove in such a way that the transport modules can only be shifted relative to each other in a longitudinal direction. For example, the longitudinal direction runs in a plane that forms a contact surface between the two transport modules. This longitudinal direction is horizontally aligned with the monument in an assembled state, for example. The first transport module further exhibits a locking element to prevent a relative motion of the two transport modules in the longitudinal direction in the assembled state.

While loading and unloading the vehicle, this makes it possible to quickly assemble or disassemble a modular monument, which in the following is also referred to simply as a monument, inside of the vehicle. For example, such a modular monument is a container or some other type of interior equipment that exhibits the transport modules, inside of which the transported material can be transported. It is also possible for the modular monument to exhibit a cover plate, which is located above the two transport modules, and on which a passenger can be transported, e.g., even in a recumbent state. As a consequence, a recumbent patient can be transported, for example during a repatriation mission.

"On top of each other" here means stacked in a vertical direction of the vehicle. For example, this vertical direction is perpendicular to the longitudinal direction of the vehicle and/or perpendicular to a floor plate of the vehicle. The longitudinal direction here describes a direction essentially parallel to the traveling direction, for example.

For example, the vehicle is a road vehicle, a railcar, or an aircraft. The vertical direction can be perpendicular to the cabin floor of an aircraft.

The modular monument can further exhibit a base plate, with which the second transport module is also connected by means of a tongue and groove joint. For example, a respective upper side of the base plate or transport modules here exhibits a groove, into which engages the tongue of the transport modules located on a lower side of the transport modules. The modular monument is hence a device comprised of the transport modules and cover plate and base plate stacked in the vertical direction, for example. It is here possible for the two transport modules to be arranged between the cover plate and base plate. It is further possible for even more than two transport modules to be arranged between the cover plate and base plate.

In the assembled state, i.e., after the individual monuments along with the base plate and cover plate have been put together, the modular monument can be transported through the aisle inside of the vehicle while loading the vehicle, so that it can be secured to a specific location inside of the vehicle, for example to a floor plate of the vehicle. To this end, the modular monument can be transported through the aisle, which in an airplane has a standard width of 50 cm. For example, the modular monument can be rolled through the passenger aisle.

During assembly of the transport modules, the transport modules are pushed against each other in such a way that the tongue is introduced into the groove, or the tongue engages into the groove in an assembled state. For example, the groove or tongue can exhibit a V-shape. Such V-grooves taper relative to the vertical direction, for example. The V-shaped groove can be continuously provided on the surface of the second transport module. Continuous means that the groove runs from one lateral surface of the transport module to an opposite lateral surface of the transport module. Correspondingly, the tongue is continuously provided on the lower side of the first transport module. The groove can also be envisaged as an oblong depression on the upper side of the second transport module having a V-shape relative to the vertical direction. The tongue can likewise be imagined as an oblong bulge on the lower side of the first transport module. The longer sides of the tongue or groove are here arranged parallel to the longitudinal direction of the vehicle, for example. If the first transport module is shifted relative to the second transport module, the two transport modules can be put together, so that the tongue is inserted into the groove in a longitudinal direction. In the assembled state, the v-shaped form of the groove or tongue thus no longer allows a vertical relative motion and a relative motion transverse to the longitudinal direction of the vehicle, i.e., transverse to the oblong groove or tongue. As a consequence, two degrees of freedom are blocked in terms of the relative motion of the two transport modules in the assembled state of the monument. In other words, the tongue and groove engage into each other in such a way that the transport modules can now only be shifted in the longitudinal direction relative to each other. The upper side of the second transport module can here come to abut flush with the lower side of the first transport module. The transverse direction here describes a direction that is perpendicular to the vertical direction and perpendicular to the longitudinal direction. In order to also block the third degree of freedom, i.e., a relative motion in the longitudinal direction of the vehicle, a locking element, e.g., one secured to the first transport module, is shifted in the vertical direction. For example, the transport modules each exhibit four lateral surfaces, which run essentially parallel to the vertical direction. In the assembled state of the monument, these lateral surfaces can be aligned flush with each other. For example, at least one lateral surface of the first transport module is aligned flush with a lateral surface of the second transport module when the tongue engages into the groove and the locking element simultaneously prevents a relative motion of the transport modules. This is the state in which no relative motion is possible between the first transport module and second transport module, for example. The locking element, for example which is secured in the area of a lateral surface of a transport module, can be present in the form of a bracket. For example, two locking elements are fastened to a transport module in the area of a respective two opposite sides of the transport module. In the assembled state, the monument can advantageously be loaded into the vehicle or unloaded from the vehicle instead of individually carrying the transport modules in the process.

In an embodiment, the locking element is fixed by means of a spring sheet in the assembled state.

For example, the locking element exhibits a grip along with a plate-shaped element, to which the grip is fastened. The grip can be secured to the plate-shaped element of the locking element in the form of a bracket, for example. On the plate-shaped element of the locking bar, a spring sheet can be secured in a rail or groove of the plate-shaped element. For example, this spring element is designed in such a way as to yield a locking mechanism for the locking element in conjunction with a pin secured to a transport module. For example, the locking element is fastened to the first transport module, and is shifted in the vertical direction, so that it latches into a specific position. This latching is characterized in that the pin, e.g., which is secured to the second transport module, engages into the spring sheet of the locking element, which is secured to the first transport module. In other words, this can also be envisaged as a kind of latching mechanism. When fixing the locking element, shifting in a vertical direction can yield a resistance, which varies as a function of how the locking element is shifted along the lateral surface of the transport module. This resistance can be provided by a compression spring, so that the resistance acts against the direction of movement of the locking element when the locking element is to be moved into the locked state. The locking element can audibly and palpably latch in place once the resistance has been overcome. The locking element can be prevented from being pushed in too far, since the plate-shaped element can come to abut flush against the base plate in the locked state of the locking element. As a consequence, a reliably locked condition can be ensured in the event of strong turbulence or acceleration forces.

In another embodiment, the monument further exhibits a fastening unit for securing the monument in a seat rail of the vehicle.

For example, such a seat rail is integrated into a floor plate of the vehicle. As a consequence, for example, the seat rail can be a seat rail inside of an airplane, in which passenger seats are fastened. This makes it possible to secure the modular monument inside of the cabin without any structural changes inside of the vehicle or airplane. This enables a rapid loading and unloading of the vehicle.

In another embodiment, the fastening unit exhibits sliding blocks that can be extended from the monument, which engage into the seat rails of the vehicle with the monument in a fastened state.

As a result, a simplified mechanism can be provided for fastening the monument inside of the vehicle. For example, the sliding blocks can be extended from the base plate, which in the assembled state of the monument is located underneath the transport modules. In other words, the fastening unit is situated inside of the base plate or in the area of the base plate of the monument. The extendible sliding blocks can be secured in the seat rails during the drive or during the flight, and be retracted into the base plate of the monument while loading or unloading the vehicle or airplane. As a consequence, the sliding blocks pose no impediment while transporting the monument inside of the vehicle, since they have been retracted into the monument, i.e., into the base plate of the monument.

In another embodiment, the monument further exhibits a transportation unit for transporting the monument inside of the vehicle. Such a transportation unit facilitates transport, for example through an aisle of the vehicle. For example, the transportation unit is integrated into the base plate of the monument. The transportation unit exhibits a mechanical connection or coupling with the fastening unit of the monument, for example. It is possible for either the fastening unit or transportation unit to be extended from the monument, i.e., from the base plate of the monument. As a consequence, the transportation unit can be extended during the loading and unloading process, and the fastening unit can be extended during the drive.

In another embodiment, the transportation unit exhibits casters that can be extended from the monument.

As a result, the modular monument along with the transported material can be easily transported through the vehicle. For example, the modular monument is rolled through a passenger aisle of the vehicle or airplane on the extendible casters. A rapid loading and unloading of the vehicle can be ensured in this way. The transportation unit and fastening unit can be joined together by a mechanical coupling. For example, this can be ensured by a drive between the fastening unit and transportation unit. Such a drive makes it possible to optionally extend the fastening unit and transportation unit. If the transportation unit is in a retracted state, for example, the fastening unit can be in an extended state at this point in time. For example, this is the case during a drive or during a flight. On the other hand, the fastening unit can be in a retracted state when the transportation unit is in an extended state. For example, this is the case while transporting the monument inside of the vehicle or airplane, or in the loading and unloading process. The transportation unit or fastening unit can be extended through mechanical actuation by the operating personnel, for example by way of a crank motion.

In another embodiment, the fastening unit and transportation unit interact in such a way that the casters are extended while retracting the sliding blocks.

As a consequence, the casters or sliding blocks can be optionally extended or retracted. This makes it possible to reliably fix the modular monument in place while the vehicle is traveling, and provide a high flexibility and mobility while loading and unloading the vehicle.

In another embodiment, the transport modules each exhibit one or more drawers, which can be extended from the transport modules along rails.

The drawers enable a reliable stowage of transported materials. This is advantageous in particular when transporting medical material. The drawers can be extended in the transverse direction of the vehicle along the rails with the monument in the fastened state. In order to extend the drawers, the latter can be provided with handles, so that the operating personnel can close or open the drawers. The drawers can also be provided with a plaque, which allows the operating personnel to detect whether the drawers have already been opened or not. As a result, the operating personnel can recognize whether material from specific drawers has to be replaced or not.

In another embodiment, the monument further exhibits a cover plate with an upper side, wherein the upper side of the cover plate forms part of a lying surface for a passenger.

This may make it possible to transport not just medical material, for example, but also a patient with little space required. To this end, several modular monuments can be fastened next to each other in the seat rail of the vehicle, so that several cover plates, i.e., the respective upper sides of the cover plates, can together form the lying surface for the passenger or patient. However, it can also be provided that fewer or more than four modular monuments be arranged next to each other for providing such a lying surface. In order to set up the lying surface for the passenger or patient, the upper sides of the cover plates can be aligned so as to be flush with one another. This makes it possible to provide a flat surface, for example to which is secured a mattress or cushioned fixture for lying down on. During the fastening process, several modular monuments are thus secured in the seat rail of the vehicle next to each other or one behind the other in relation to the longitudinal direction, as takes place when loading the vehicle, for example. In order to dismantle the system once again after the vehicle has arrived at its destination, the mattress unit can first be removed, after which the modular monuments can be detached from the seat rail, for example by cranking out the transportation unit and simultaneously cranking in the fastening unit. The cover plates of the modular monuments can then be detached. For example, this can be done by pressing down on the middle of the locking elements, so that the spring sheets or latching springs can be released, and the entire bolt can be retracted a bit. As a consequence, the cover plate can be detached, and then be laterally retracted from the V-grooves. The same procedure is to be similarly performed for the other transport modules. The only difference involves the unlocking process, since handles extend on the lateral surfaces when the latching springs are released. To this end, the locking elements exhibit handles that serve as handholds, making it easier to displace and lift the transport modules. After the modular monument has been taken apart, the used consumable material can again be filled into the drawers. In particular, the transport module can be sealed once it has been cleaned and refilled, so that the box module is prepared for a new application.

In another aspect, the modular monument can be fastened in the first class of a cargo plane or airliner. To this end, a partition wall can be removed from a section inside of the passenger cabin, so that several modular monuments can be provided in the seat rail of the floor plate in the passenger cabin. This will be explained in even more detail based on an example in the description to the figures.

Another aspect relates to a stretcher with a modular monument. This stretcher can be secured to an upper side of the modular monument or cover plate of the monument. The stretcher can here be fastened on or to several monuments arranged one next to the other.

Another aspect further relates to a method for transporting a transported material in a vehicle. In one step of the method, a monument with a first and second transport module is prepared. In another step of the method, the transport modules are arranged one on top of the other, for example along a vertical direction. In another step of the method, the transport modules are aligned in such a way as to be aligned flush with each other on a lateral surface of the monument with the monument in an assembled state. A tongue and groove engage into each other in another step in such a way that the transport modules can be shifted relative to each other in a longitudinal direction. During this engagement of the tongue and groove, it can be provided that the transport modules now only be shiftable in a longitudinal direction. In another step of the method, a locking element prevents a relative motion of the transport modules in the longitudinal direction in the assembled state. For example, this locking element is fastened to the first transport module and/or second transport module.

BRIEF DESCRIPTION OF THE DRAWINGS

The various embodiments will hereinafter be described in conjunction with the following drawing figures, wherein like numerals denote like elements, and.

Exemplary embodiments will be described in the following with reference to the figures below.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
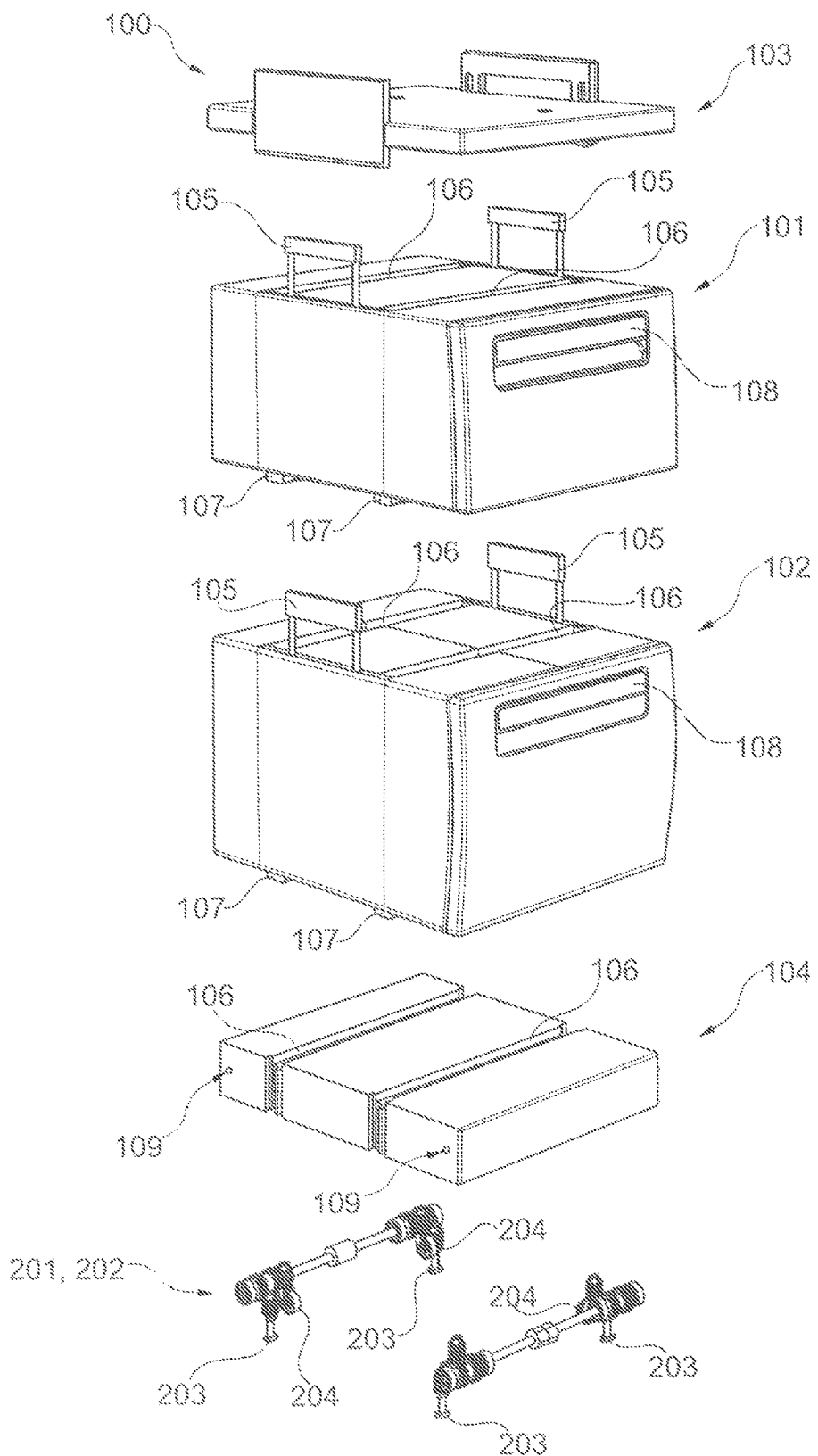
FIG. 1 shows an exploded view of a modular monument according to an exemplary embodiment.

FIG. 1 presents an exploded view of a modular monument 100, which exhibits a first transport module 101, a second transport module 102, a base plate 104 as well as a cover plate 103. The individual units of the modular monuments 100 are here arranged one on top of the other, i.e., along a vertical direction. The modular monument 100 further exhibits a fastening unit 201 along with a transportation unit 202, for example which are integrated into the base plate 104. In the following, an upper area of the modular monument 100 is bordered by the cover plate 103, and a lower area of the modular monument 100 is bordered by the base plate 104. One lower side of the transport module 101 exhibits two tongues 107, which extend along the lower side in a longitudinal direction. For example, the longitudinal direction is essentially parallel to a traveling direction of a vehicle in which the modular monument 100 is integrated or secured. The two tongues 107 exhibit a V-shape, for example. The upper side of the first transport module 101 can be provided with two grooves 106, which extend along the longitudinal direction in the form of a depression in the first transport module 101. The first transport module 101 further exhibits a drawer, which can be extended from the transport module with a handle 108. The upper side of the second transport module 102 also exhibits two grooves 106, which also extend in the longitudinal direction, and into which the tongues 107 of the first transport module 101 engage with the modular monument 100 in an assembled state. For example, the tongues 107 engage into the grooves 106 in such a way as to block a relative motion between the first transport module 101 and second transport module 102 in a transverse direction and the vertical direction. The vertical direction here represents the longitudinal direction, and the transverse direction comprises a right-handed coordinate system, for example. In other words, the tongues 107 of the first transport module 101 engage into the grooves 106 of the second transport module 102 in such a way that a relative motion of the two transport modules 101 and 102 can now only take place in the longitudinal direction. The relative motion in the longitudinal direction can be achieved through additional locking by means of locking elements 105. The two transport modules 101 and 102 can here each exhibit two locking elements 105, which are located in an area of opposing lateral surfaces of the transport modules 101 and 102. For example, such locking elements 105 can exhibit the shape of a bracket. A handle is here joined with a plate-shaped element by means of two rod-shaped elements. The locking elements 105 can be shifted in the vertical direction until the locking elements 105 are fixed in place by means of a locking mechanism in such a way as to also preclude the relative motion of the two transport modules 101 and 102 in the longitudinal direction. In this locking mechanism, for example, a pin attached to the second transport module 102 engages into a spring sheet, which is situated in the plate-shaped element of the locking element 105. The locking element 105 is shifted against a resistance, for example one triggered via a compression spring. The same mechanism is used to also connect and fix the cover plate 103 with the first transport module 101, for example. Similarly, the second transport module 102 can also be joined with the base plate 104, so as to preclude the respective relative motion of the transport modules 101 and 102 and the cover plate 103 and base plate 104. In other words, a compact modular monument 100 comes about, whose individual parts can no longer be shifted relative to each other in any direction. The base plate 104 further incorporates a fastening unit 201, which exhibits extendible sliding blocks 203. Also incorporated into the base plate 104 is a transportation unit 202, which exhibits castors 204. For example, the fastening unit 201 exhibits four sliding blocks 203, and the transportation unit 202 exhibits four casters 204. A respective two casters 204 or two sliding blocks 203 are here connected with each other by means of a rod-shaped element or shaft.

Figure 2:
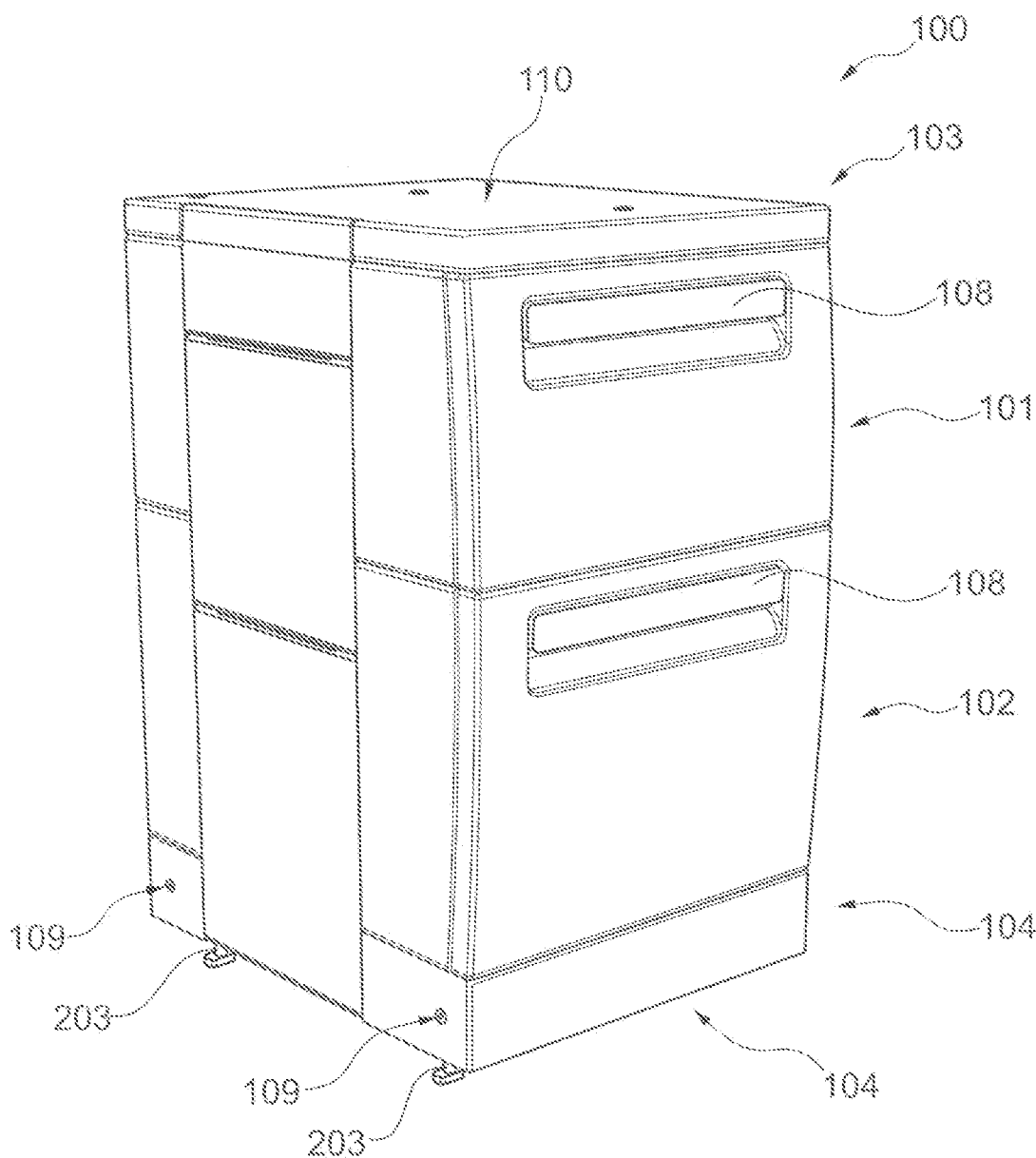
FIG. 2 shows a perspective view of a modular monument in the assembled state according to an exemplary embodiment.

FIG. 2 presents a perspective view of a modular monument 100 in the assembled state. In the assembled state, the plate-shaped elements of the locking elements 105 are shifted in the vertical direction relative to the transport modules 101 and 102 as well as the cover plate 103 and base plate 104 in such a way that a plate-shaped element of the locking element 105 protrudes over a respective two units of the modular monument 100. In other words, a plate-shaped element of the locking element 105 protrudes over the first transport module 101 as well as over the second transport module 102 on the lateral surface in the assembled state. As a consequence, a relative motion in the longitudinal direction can be precluded. The cover plate 103 further exhibits an upper side 110, which can make up part of a lying surface for a passenger or a patient. Both the first transport module 101 and second transport module 102 each exhibit a drawer, which can be pulled out of the respective transport module by a handle 108. The base plate 104 further exhibits a cranking mechanism 109 on one lateral surface. For example, this cranking mechanism 109 can be a hexagon socket, e.g., which can be actuated using a cordless screwdriver or hexagon wrench. Two respective cranking mechanisms 109 are provided on two opposing sides of the base plate 104, for example. These cranking mechanisms 109 can be used to optionally extend the sliding blocks 203 or casters 204. This extension or retraction can be achieved by cranking, i.e., by turning the hexagon socket of the cranking mechanism 109.

Figure 3:
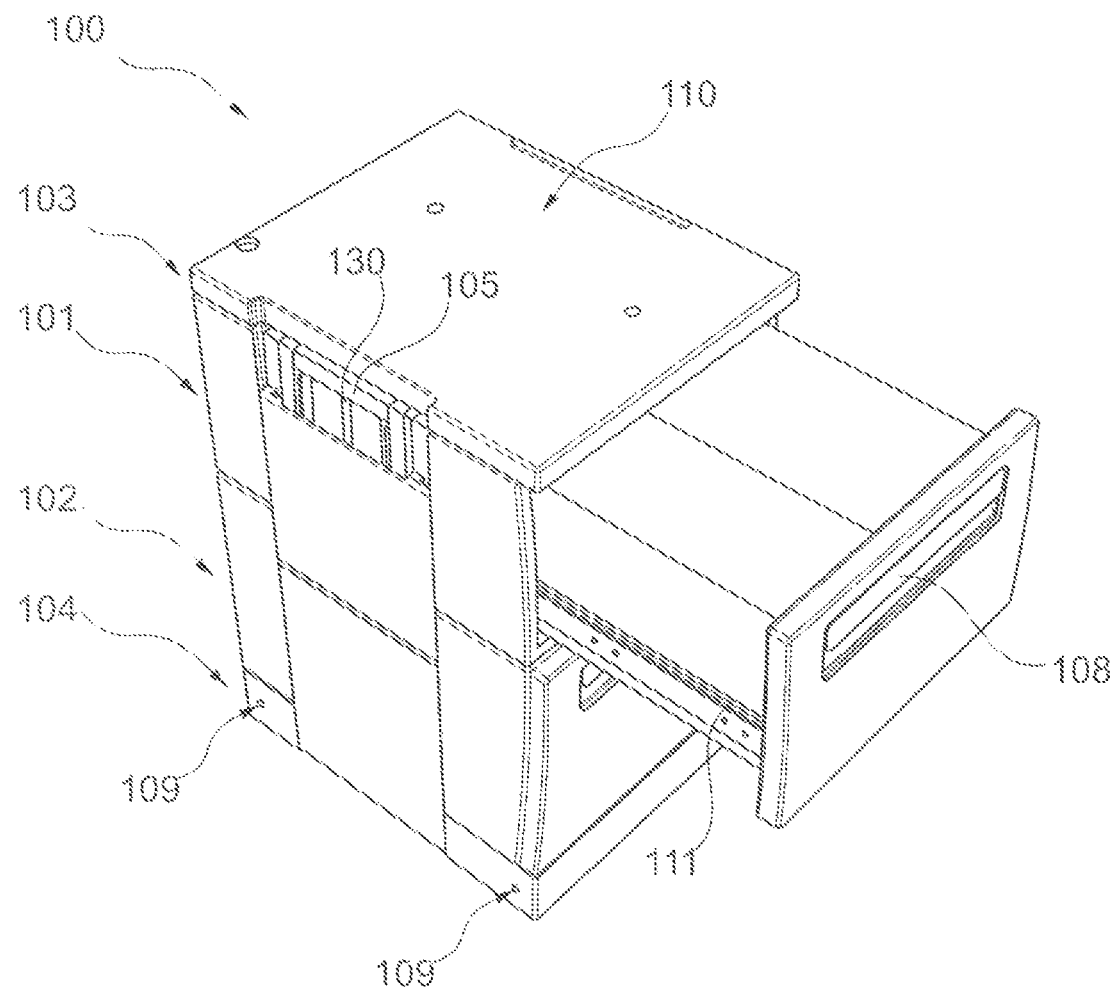
FIG. 3 shows a perspective view of a modular monument with drawer extended according to an exemplary embodiment.

FIG. 3 presents a perspective view of an assembled modular monument 100 with an extended drawer. The drawer exhibits a handle 108, with which it can be extended from or retracted into the transport module 101 along a rail 111. The depiction on FIG. 3 further shows a spring element 130. The latter is visible in the illustration shown, since a plate-shaped element of the locking element 105 of the cover plate 103 is hidden from view. For example, the spring element 103 is a compression spring, which is exposed to pressure as the locking element 105 of the first transport module 101 is vertically shifted, e.g., when the locking element 105 is in the latched state.

Figure 4A:
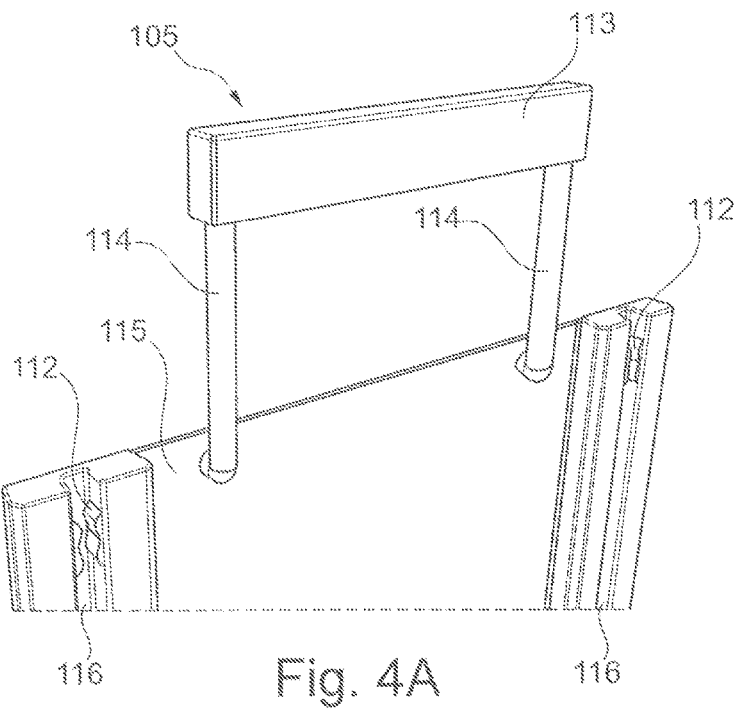
FIG. 4A shows a perspective view of part of a locking element according to an exemplary embodiment.

FIG. 4A shows a locking element 105 that exhibits a handle 113 along with a plate-shaped element 115, wherein the handle 113 is joined with the plate-shaped element 115 by way of two rod-shaped or pipe-shaped elements 114. In the area of the plate-shaped element 115, the locking element 105 exhibits two grooves 116, which in the assembled state extend like a rail along the vertical direction in the locking element 105. Further mounted in these grooves 116 or rails are two spring sheets, of which only a respective one is visible on FIG. 4A. These spring sheets 112 are provided for latching into a pin secured to a transport module, and thus prevent a relative motion between the transport modules 101 and 102 in the longitudinal direction.

Figures 4B, 4C:
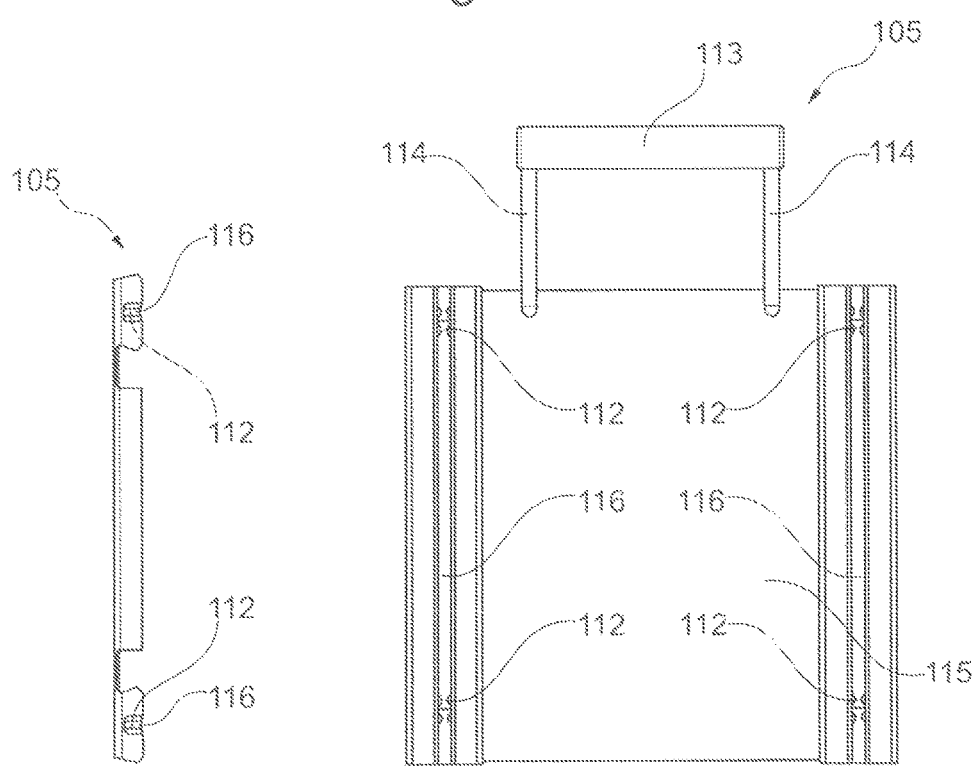
FIG. 4B shows a top view of a locking element according to an exemplary embodiment.
FIG. 4C shows a side view of a locking element according to an exemplary embodiment.

FIG. 4B presents a top view of a locking element 105, in which the spring sheets 112 are secured in the respective rails or grooves 112 in such a way as to narrow the rail or groove 116 in a specific area. This narrowing ultimately causes the pin secured to a transport module to latch into the spring sheet, so that the locking element 105 can be prevented from shifting in the vertical direction when not actuated.

FIG. 4C presents a side view of a locking element 105 with a handle 113 and a plate-shaped element 115, wherein the plate-shaped element 115 and handle 113 are connected by rod-shaped elements 114. The groove or rail 116 extends continuously in the vertical direction on the plate-shaped element 115. As evident, two respective spring sheets 112 are secured in the two grooves or rails 116.

Figure 5:
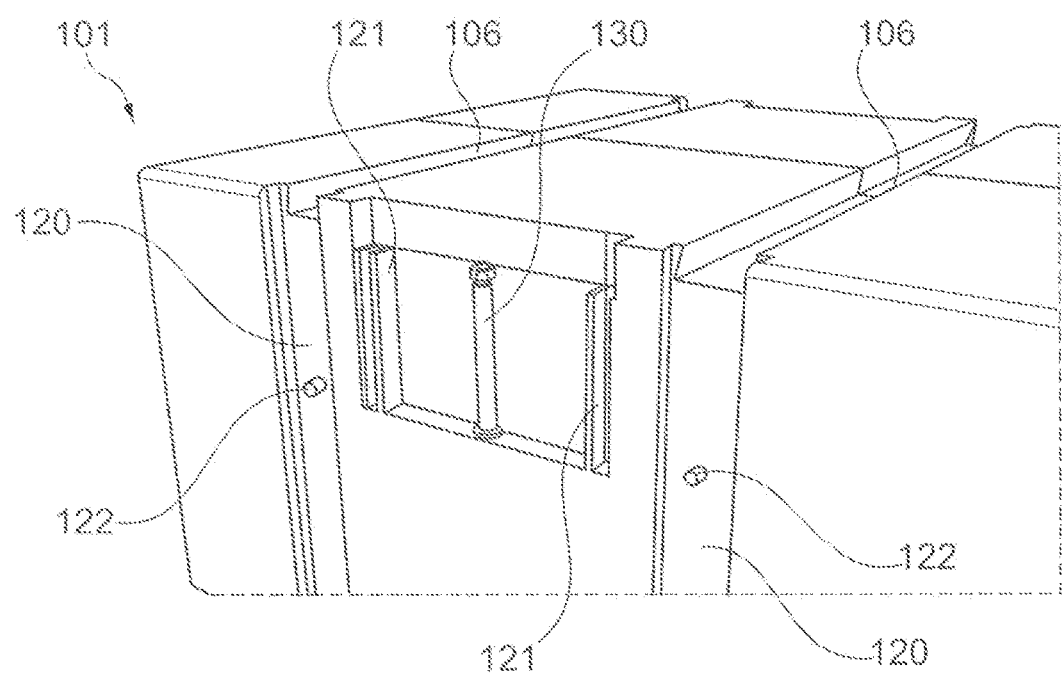
FIG. 5 shows a perspective view of part of a transport module according to an exemplary embodiment.

FIG. 5 shows part of the first transport module 101, whose upper side is provided with V-shaped grooves 106. Further provided on a lateral surface of the first transport module 101 are two additional grooves 120, which can also be V-shaped and extend in the vertical direction. These additional grooves 120 can extend continuously on the lateral surface of the transport module 101 over the entire height of the transport module 101. Secured in these additional grooves 120 are pin-shaped elements 122, which are cylindrical in shape and protrude perpendicularly out of the lateral surfaces of the first transport module 101 inside of the additional grooves 120. For example, a pin 122 is provided in each of the two additional grooves 120. The two pins 122 are designed to provide a latching mechanism in connection with the spring sheets 112. Accordingly, the pins 122 can latch into the spring sheets 112 of the locking element 105. As a consequence, it can be ensured that the locking element becomes fixed, so that a relative motion of the transport modules 101 and 102 or of the cover plate 103 or base plate 104 in the longitudinal direction can also be prevented. In other words, none of the constituent parts of the monument, i.e., the first transport module 101, the second transport module 102, the cover plate 103 and the base plate 104, can move relative to each other in the assembled state. The plate-shaped element 115 can in turn exhibit two tongues, which in the assembled state engage into the additional grooves 120, and in which the rails 116 with the spring sheets 112 are located. FIG. 5 further depicts two holding elements 121, which are also designed like a rail, and fastened to the first transport module 101 or integrated therein. These holding elements 121 are designed to guide the rod-shaped elements 114 of the locking element 105, so as to ensure that the locking elements 105 shift in a vertical direction. To this end, the holding elements 121 are situated in the area of the lateral surfaces of the transport modules. For example, the spring element 130 is arranged centrally between the two other grooves 120 and/or centrally between the two holding elements 121. The spring element 130 is also rod shaped or pipe-shaped in design, which serves in particular to guide the compression springs arranged in the spring element 130. The spring element 130 is further aligned parallel to the additional grooves 120 and/or to the lateral surfaces of the respective transport module.

Figure 6:
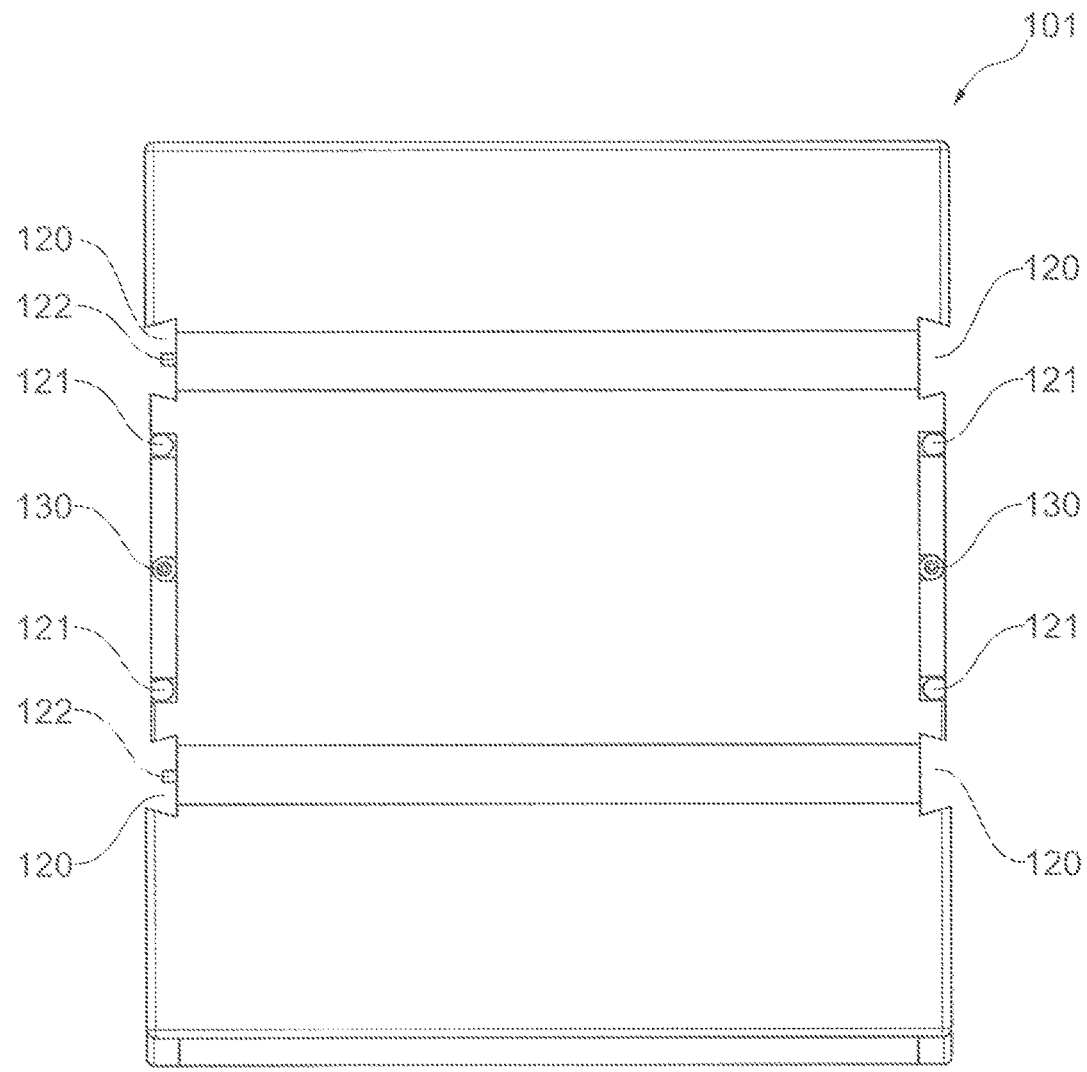
FIG. 6 shows a top view of a transport module according to an exemplary embodiment.

FIG. 6 presents a top view of the first transport module 101. Also visible are the additional grooves 120, which are arranged on two opposing lateral surfaces of the first transport module 101. Let it be noted that the lateral surfaces of the transport modules can be essentially parallel to the vertical direction. Secured in the additional grooves or rails 120 are the pins 122, which protrude out of the lateral surfaces of the first transport module 101, for example cylindrically in the longitudinal direction, meaning perpendicular to the vertical direction. Also arranged on both sides of the first transport module 101 are spring elements 130. These spring elements 130 also have an oblong shape, which runs essentially parallel to the vertical direction. The holding elements 121, of which a respective two are situated on the two opposing sides of the first transport module 101, serve to guide the rod-shaped elements 114 of the locking element 105, which is also denoted in the form of an indicated sector in the area of the holding elements 121. It can be provided that the first transport module 101 exhibit the same components or features as the second transport module 102.

Figure 7:
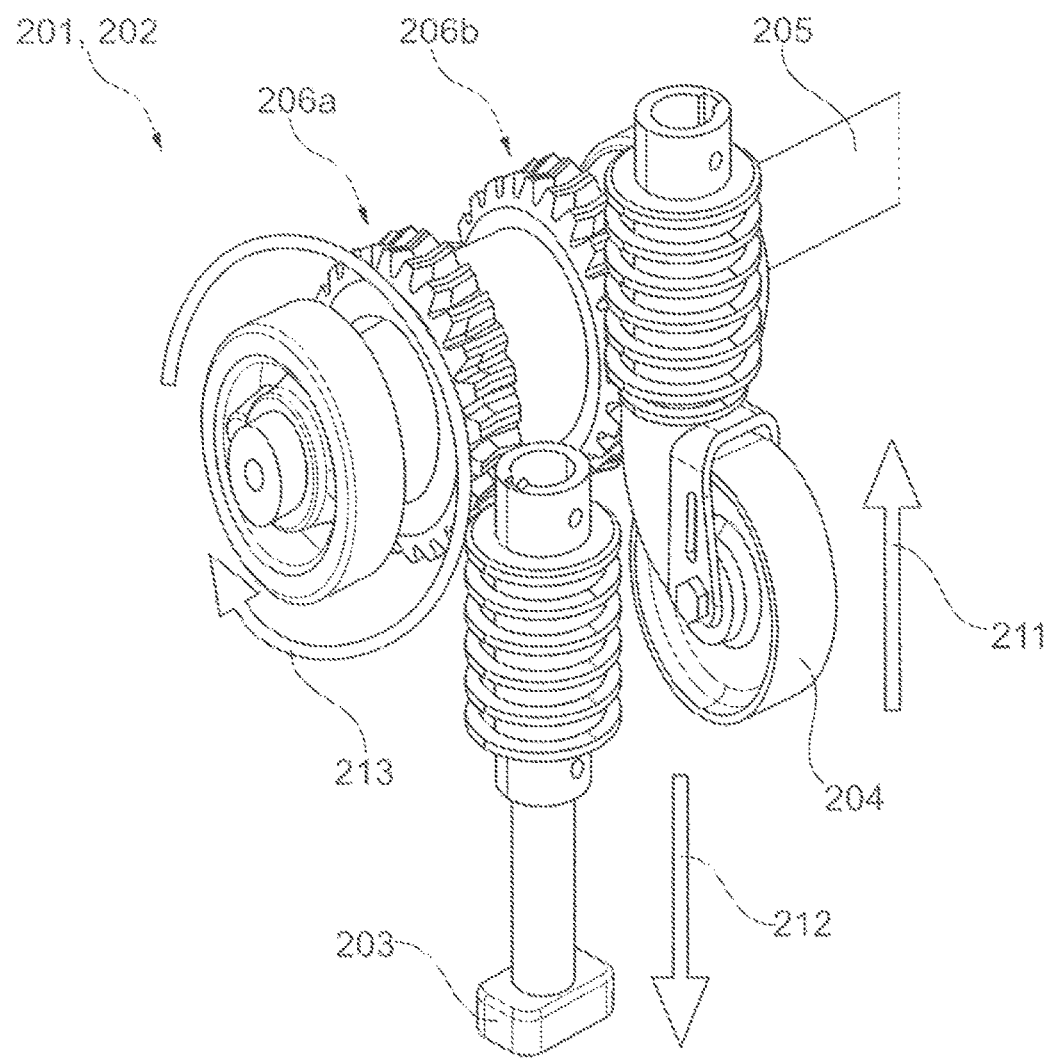
FIG. 7 shows a mechanical coupling between a transportation unit and a fastening unit according to an exemplary embodiment.

FIG. 7 shows the fastening unit 201 and transportation unit 202. The fastening unit 201 exhibits a sliding block 203, which can be moved in the vertical direction. FIG. 7 depicts the extended state of the sliding block 203, in which the direction of extension 212 is represented by an arrow. In the state presented on FIG. 7, the transportation unit 202, which exhibits a caster 204, is further in a retracted state. The direction of retraction 211 denoted by an arrow points opposite to the direction of extension 212. In other words, the sliding block 203 or caster 204 can optionally be extended or retracted. For example, the transportation unit 202 and fastening unit 201 are coupled by way of a worm gear. By rotating the rod-shaped element 205, for example which is designed like a shaft, either the fastening unit 201 or transportation unit 202 can be retracted or extended. The rotational direction 213 is denoted by an arrow. The shaft 205 is rotated by means of a cranking mechanism, which can be generated via a hexagon socket and hexagon wrench when correspondingly operated by the operating personnel. Gearwheels (206a, 206b) can be provided on the shaft 205 to effect movement in the direction of extension 212 or direction of retraction 211. For example, these two gearwheels can be spur gears, which are joined with the sliding block or with the caster by means of a connecting element.

The shaft 205 can be rotated from two opposing sides of the base plate 104, thereby making it possible to assemble or retract and extend the fastening unit 201 and transportation unit 202 from every side. The shaft 205 can exhibit two globoid areas, which in turn each exhibit two cylindrical worms. This makes it possible to provide a worm gear, so that an opposite rotation of the shaft 205 enables a retraction or extension. The cylindrical work can additionally be guided by a guide thread, so that a reliable motion can be ensured. The shaft 205 can be axially and radially mounted by means of cylindrical roller bearings via two O-bearings. Turning the hexagon socket makes it possible to extend the casters or wheels in one direction, and retract the sliding blocks situated adjacent thereto and vice versa.

Figure 8:
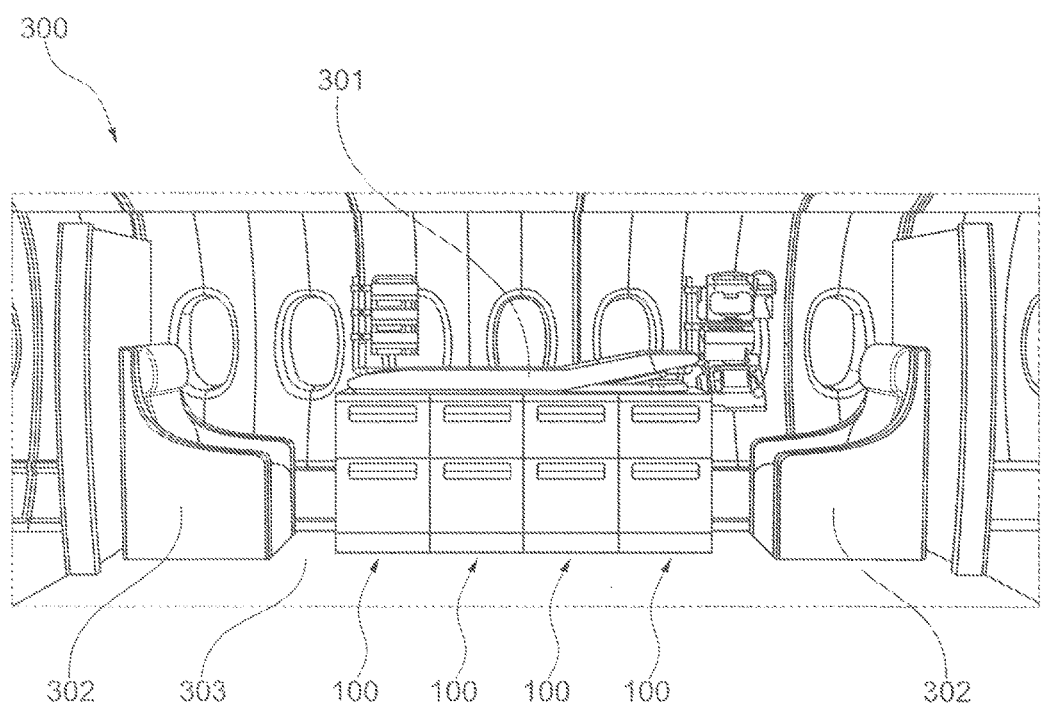
FIG. 8 shows an arrangement of several modular monuments inside of an airplane cabin according to an exemplary embodiment.

FIG. 8 presents a section of a cabin 300 of an airliner. Shown here is a passenger compartment with two passenger seats 302 and modular monuments 100 arranged between the passenger seats 302. In the depicted configuration, four modular monuments 100 are arranged next to each other in the longitudinal direction of the airplane. The upper sides 110 of the cover plates 103 of the modular monuments 100 here each comprise one part of a lying surface, so that a lying surface can be prepared for a passenger or patient by combining or arranging the modular monuments 100. A mattress 301 can be placed or secured on this lying surface. For example, the modular monuments 100 are fastened to the floor plate of the passenger cabin, just as the passenger seats 302. The modular monuments 100 can here be secured in a seat rail of the cabin floor. The sliding blocks extended from the base plate 104 of the respective modular monuments 100 are in this fastened state in the seat rails of the cabin floor 303. Just as with the seat arrangement, how the modular monuments 100 are arranged next to each other can depend on the airline. In general, it can be provided that a seat 302 be aligned in the direction of flight, and another seat 302 opposite thereto. In the configuration shown on FIG. 8, a partition wall between two sections each having a seat 302 was removed from the cabin, so that the modular monuments 100 can be placed between the two seats 302 of two initially different sections. An elongated section is available as a result. Nearly no space is here advantageously wasted between the aisle and patient transport unit, i.e., the modular monuments 100. In addition, the modular construction enables a rapid retrofitting and hygienic cleaning of the modular monuments 100. In other words, providing the modular monuments 100 in the cabin of the airplane creates a great deal of flexibility, for example as relates to the provision of medical equipment.

For example, the modular monument 100 here exhibits a height of 70 cm in the vertical direction in relation to the passenger floor 303. The pieces of equipment can hence be accommodated in the drawers of the modular monuments 100 under the mattress holder. It can be provided that first aid equipment be sorted into the transport modules 101 and 102. Material to be consumed during the flight, for example, is sealed after replenished, making the integrity visible right away. In turn, this accelerates and simplifies the cleaning effort, since only those transport modules 101 and 102 or drawers that were actually opened have to be disinfected from inside. In addition, the time expended by the attending operating personnel is significantly reduced, since it does not have to individually sort and log each object. Electrical devices can also be provided in the transport modules 101 and 102. For example, these can be medical devices. The transport modules 101 and 102 or drawers can be provided with a specific symbol that identifies the content of the transport module.

Figure 9:
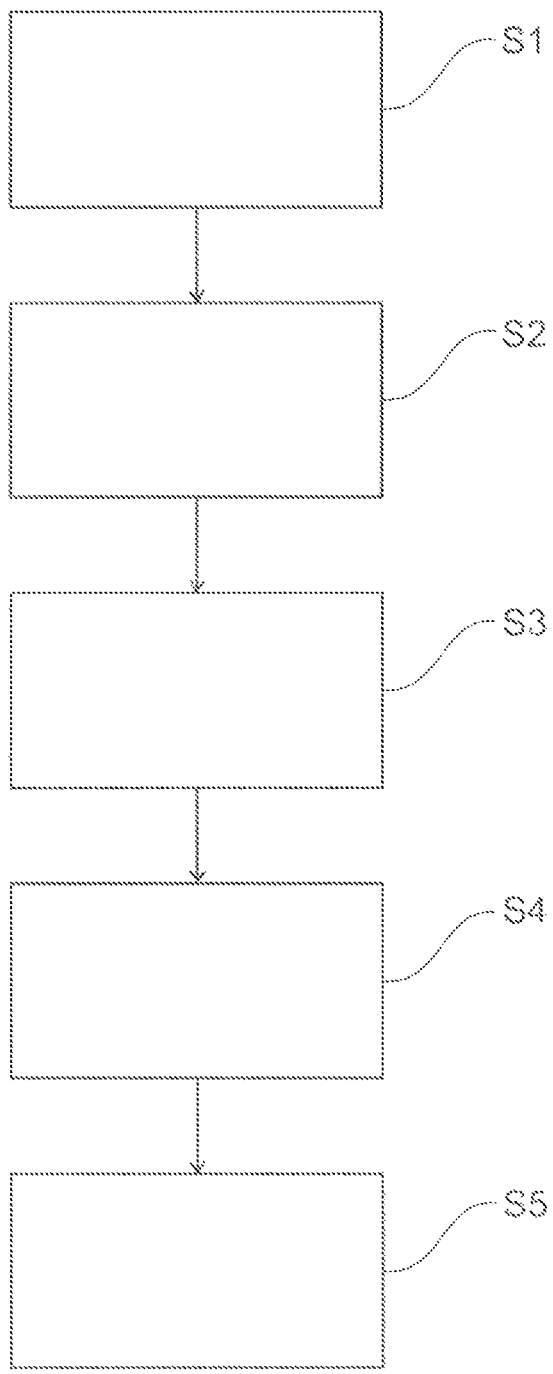
FIG. 9 shows a flowchart for a method for transporting a transported material in a vehicle according to an exemplary embodiment.

FIG. 9 presents a flowchart for a method for transporting an item or good, e.g., medical equipment or medical devices or patients, in a vehicle. In particular, the vehicle can be an aircraft. In a first step S1 of the method, a monument 100 with a first transport module 101 and a second transport module 102 is provided. In a second step S2, the transport modules are arranged one on top of the other, for example in a vertical direction. In another step S3, the transport modules are aligned in such a way as to be aligned flush with each other on a lateral surface of the monument 100 with the monument 100 in an assembled state. In a further step S4, a tongue 107 and groove 106 engage into each other in such a way that the transport modules can be shifted relative to each other in a longitudinal direction. In another step S5, a relative motion of the transport modules in the longitudinal direction is prevented in the assembled state. For example, this is achieved by means of a locking element 105.

In addition, let it be noted that "comprising" or "exhibiting" does not preclude any other elements or steps, and that "a" or "an" does not rule out a plurality. Let it further be noted that features or steps described with reference to one of the above exemplary embodiments can also be used in combination with other features or steps of other exemplary embodiments described above. Reference numbers in the claims are not to be construed as a limitation. Let it also be noted that the procedural steps of the described method can be performed in any sequence desired.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A modular monument for transporting an item in a vehicle, the modular monument comprising:
   a first transport module with a tongue;
   a second transport module with a groove;
   wherein the two transport modules are arranged one on top of the other and aligned flush with each other on a lateral surface of the monument with the monument in an assembled state;
   wherein the tongue and groove engage into each other in the assembled state of the monument in such a way that the first and second transport modules can be shifted relative to each other in a longitudinal direction of the transport modules; and
   wherein the first transport module comprises a locking element configured to prevent a relative motion of the first and second transport modules in the longitudinal direction of the transport modules in the assembled state;
   a fastening unit connected to the second transport module;
   wherein the fastening unit is configured to fasten the monument in a seat rail of the vehicle, and
   wherein the fastening unit comprises sliding blocks being extendible from the monument that engage into the seat rail of the vehicle to configure the monument into a fastened state; and
   a transportation unit configured to transfer the monument inside of the vehicle;
   wherein the transportation unit comprises casters configured to extend from the monument;
   wherein the fastening unit and the transportation unit interact in such a way that the casters are extended while retracting the sliding blocks; and
   wherein the interaction is achieved by a cranking mechanism.

2. The modular monument of claim 1, wherein the locking element is fixed by a spring sheet in the assembled state.

3. The modular monument of claim 1, wherein the transport modules each comprise one or more drawers, configured to be extended from the transport modules along rails.

4. The modular monument of claim 1, further comprising:
   a cover plate with an upper side;
   wherein the cover plate is connected to the first transport module; and wherein the upper side of the cover plate forms part of a lying surface for a passenger.

5. A method for transporting an item in a vehicle, comprising the following steps:
providing a monument with a first transport module and a second transport module;
arranging the two transport modules one on top of the other;
aligning the two transport modules in such a way as to be aligned flush with each other on a lateral surface of the monument with the monument in an assembled state;
engaging a tongue and groove into each other in such a way that the first and second transport modules can be shifted relative to each other in a longitudinal direction of the transport modules;
preventing a relative motion of the first and second transport modules in the longitudinal direction of the transport modules in the assembled state, using a locking element;
providing a fastening unit connected to the second transport module;
wherein the fastening unit is configured to fasten the monument in a seat rail of the vehicle;
wherein the fastening unit comprises sliding blocks being extendible from the monument, which engage into the seat rail of the vehicle to configure the monument into a fastened state;
providing a transportation unit configured to transport the monument inside of the vehicle;
wherein the transportation unit comprises casters configured to extend from the monument;
wherein the fastening unit and the transportation unit interact in such a way that the casters are extended while retracting the sliding blocks; and
wherein the interaction is achieved by a cranking mechanism.

6. A modular monument for transporting an item in a vehicle, the modular monument comprising:
a first transport module with a tongue;
a second transport module with a groove;
wherein the two transport modules are arranged one on top of the other and aligned flush with each other on a lateral surface of the monument with the monument in an assembled state;
wherein the tongue and groove engage into each other in the assembled state of the monument in such a way that the first and second transport modules can be shifted relative to each other in a longitudinal direction of the transport modules;
wherein the first transport module comprises a locking element configured to prevent a relative motion of the first and second transport modules in the longitudinal direction of the transport modules in the assembled state; and
wherein the locking element is fixed by a spring sheet in the assembled state;
a fastening unit connected to the second transport module;
wherein the fastening unit is configured to fasten the monument in a seat rail of the vehicle;
wherein the fastening unit comprises sliding blocks being extendible from the monument, that engage into the seat rail of the vehicle to configure the monument into a fastened state; and
a transportation unit configured to transport the monument inside of the vehicle;
wherein the transportation unit comprises casters configured to extend from the monument;
wherein the fastening unit and the transportation unit interact in such a way that the casters are extended while retracting the sliding blocks; and
wherein the interaction is achieved by a cranking mechanism.

* * * * *